United States Patent
Flanagan et al.

(10) Patent No.: US 7,860,518 B2
(45) Date of Patent: Dec. 28, 2010

(54) LOCATING A MOBILE STATION INSIDE A BUILDING

(75) Inventors: Michael J. Flanagan, Chester, NJ (US);
Gregg Nardozza, Glenwood, NJ (US);
Vic Pan, Bedminster, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 746 days.

(21) Appl. No.: 11/770,957

(22) Filed: Jun. 29, 2007

(65) Prior Publication Data

US 2008/0119208 A1  May 22, 2008

Related U.S. Application Data

(60) Provisional application No. 60/859,613, filed on Nov. 17, 2006.

(51) Int. Cl.
*H04W 24/00* (2009.01)
(52) U.S. Cl. .............. 455/456.1; 455/456.2; 455/456.5; 455/456.6
(58) Field of Classification Search ...... 455/456.1–457, 455/404.2, 442, 67.11–67.13, 9, 560–562.1; 370/331–332, 312, 328
See application file for complete search history.

(56) References Cited

U.S. PATENT DOCUMENTS 7,139,580 B2 * 11/2006 Stein et al. ............... 455/456.1

2006/0003695 A1 * 1/2006 Kennedy et al. ............ 455/9
2006/0025158 A1 * 2/2006 Leblanc et al. .......... 455/456.2

FOREIGN PATENT DOCUMENTS

| EP | 1094335 A1 | 4/2001 |
| EP | 1380851 A1 | 1/2004 |
| WO | 0120944 A1 | 3/2001 |
| WO | 02087275 A2 | 10/2002 |
| WO | 03058986 A2 | 7/2003 |

OTHER PUBLICATIONS

International Preliminary Report on Patentability for International application No. PCT/US2007/023814 mailed Feb. 24, 2009.
International Search Report and Written Opinion of the International Searching Authority for International application No. PCT/US2007/023814 mailed Jun. 11, 2008.

* cited by examiner

*Primary Examiner*—Kamran Afshar
(74) *Attorney, Agent, or Firm*—Carlson, Gaskey & Olds PC

(57) ABSTRACT

Locating mobile stations used for wireless communications even when the mobile station is within a building includes determining whether at least one indicator associated with a signal used by the mobile station identifies a single, known building location. Example types of indicators include a base station and sector identifier of a base station sector dedicated to a particular building, a delay associated with a radio frequency signal used by the mobile station when communicating from a particular building location or a combination of cell codes reported by a mobile station when it is within a particular building location. One or more of such indicators provides an indication of a building location from which the mobile station has placed a call. That building location can then be used as the determined mobile station location.

15 Claims, 4 Drawing Sheets

LOCATING A MOBILE STATION INSIDE A BUILDING

CROSS REFERENCE TO RELATED APPLICATIONS

This application claims priority to U.S. Provisional Application No. 60/859,613 which was filed on Nov. 17, 2006.

FIELD OF THE INVENTION

This invention generally relates to communication. More particularly, this invention relates to wireless communication.

DESCRIPTION OF THE RELATED ART

Wireless communications are widely used for a variety of purposes such as voice calls and data calls. One limitation on wireless communications has been the ability to respond to emergency request calls (e.g., 911 or 112 calls) made from a mobile station when a mobile station is in a location that cannot be easily identified. Locating the mobile station is necessary to provide an appropriate response to such an emergency call.

There are two generic geo-location approaches that are used for responding to emergency calls. Both approaches are based upon "triangulation" and rely upon the ability of a mobile station to receive radio frequency signals and measure the radio frequency propagation times from multiple macrocells or from multiple overhead satellites. There are several different satellite systems developed for navigation and timing. The most famous of these is the US Navistar GPS and the Russian GLONASS GPS systems. There are others being planned such as Galileo (European), INRSS (Indian), or Beidou (Chinese) systems. GPS refers to any of these satellite systems. Triangulation computations are performed using the estimated ranges as input parameter values to determine the location of the mobile station. There are variations on these triangulation approaches that depend upon the cellular technology, the positions of macrocells or satellites and the mobile station's computation capabilities.

The accuracy of known approaches depends upon three major factors: first, the mobile station's ability to receive RF signals from at least three or four transmitting devices (macrocell or satellite); second, the triangulation distances between transmitting and receiving devices; and third, timing accuracy and synchronization.

In the case of macrocell triangulation, larger cell radii diminishes a mobile station's ability to receive signals from multiple macrocells. In rural areas, for example, there may not be a sufficient number of macrocells that can be seen by a mobile station such that macrocell-based triangulation is not possible. In urban and suburban areas, RF blockages can prevent other macrocells from being seen by a mobile station, which renders macrocell triangulation ineffective. Triangulation over macrocell distances is inherently less accurate compared to satellite triangulation, which makes timing accuracy and synchronization far more critical. With base station technologies that do not sufficiently synchronize timing among base stations such as GSM or UMTS, global positioning system (GPS) information is used to track how far off each base station clock is and "timing correction" messages are periodically broadcasted to mobile stations so that they can correct their range estimates. Because small timing errors create large GEO-location errors especially over short triangulation distances, these timing corrections are sent frequently and this creates a significant traffic load between a base station and a GPS timer and between the GPS timer and a mobile station.

GPS GEO-location (satellite based) is inherently much more accurate than macrocell triangulation. With GPS triangulation, there must be at least four overhead satellites seen by a mobile station (i.e., three satellites used for X, Y, Z positioning and a fourth for mobile station timing offset information). In the case of GPS, satellite orbits have been designed such that there are six earth orbits each populated with four non-GEO synchronized satellites providing between six and eleven overhead satellites visible in a clear sky at all times. Nonetheless, it is possible that a mobile station will not see at least four satellites when RF blockages prevent satellite reception, for example. The situation can arise, for example, when the mobile station is within a deep urban cannon such as the streets of Manhattan. Skyscrapers and other structures tend to block the mobile station's view of the sky. When a mobile station's view of the sky is not diminished or restricted, GPS triangulation accuracy is useful.

Timing synchronization is not a problem with GPS triangulation because each of the satellites is equipped with an atomic clock and ground communications continuously monitor clock accuracy to provide extremely accurate satellite timing synchronization. The need for a highly accurate mobile station clock is avoided by using a fourth satellite range measurement.

GPS based GEO-location approaches have a unique problem in meeting the Federal Communication Commission requirement in the United States to GEO-locate an emergency call within thirty seconds. A mobile station, upon power up, may take as long as fifteen minutes to locate the satellites necessary for GPS location. Much of this time is spent transmitting satellite almanac data over a fifty BPS data channel. Assisted GPS (AGPS) provides the mobile station with dynamic satellite positioning data over a high speed communications channel to meet the FCC's thirty second positioning requirement. Of course, not all emergency calls are made by first turning on a mobile station. When a call is made from an already turned on mobile station, the satellites are already acquired. In such an instance, the call and GEO-location commence immediately.

Chipset manufacturers and handset manufacturers are moving toward GPS for emergency call GEO-location. Commercially available GPS chip sets are designed to work in GSM and UMTS handsets in terminals that support HSDPA, GPRS and EDGE. GPS receivers are part of CDMA 2000 technologies and are included in CDMA handsets and similar devices. GPS based GEO-location appears to be an emerging dominant technical approach for emergency call GEO-location.

While there have been great difficulties in meeting requirements for locating emergency calls from mobile stations outdoors, the GEO-location problem inside of buildings is even more formidable. The major stumbling block is that the building itself tends to block macrocell and satellite signals that are otherwise available outside of the building. Inside a building, none of the known GEO-location triangulation methods work when the macrocell and satellite signals are not available in the building. At best, GEO-location triangulation might be possible by placing a call from a position near a window perhaps on an upper floor where there might be sufficient signal strength to "see" the required number of macrocells or satellites to perform traditional GEO-location. Even still, this is not generally possible by all windows in a building. Moreover, anywhere near the center of a building typically results in no receivable GPS signals. Even buildings that have a distributed antenna system (DAS) for distributing cellular base station signals for making calls within a building do not provide triangulation signals that are useful for GEO-location. Essentially most of the area inside most buildings where it may be possible for someone to place an emergency call using a mobile station are areas where existing triangulation GEO-location methods will not work.

SUMMARY

An exemplary method of locating a mobile station that is used for wireless communication includes determining whether at least one indicator associated with a signal used by the mobile station for a wireless communication identifies a single, known building location. A location of the mobile station is determined as the known building location based upon that indicator.

In one example, the indicator that identifies the building location comprises at least one of (i) a base station and sector designation of a base station sector within which the mobile station was served, (ii) a time delay of a radio frequency signal used for communication with the mobile station, or (iii) a combination of cell codes reported by the mobile station.

The various features and advantages of this invention will become apparent to those skilled in the art from the following detailed description. The drawings that accompany the detailed description can be briefly described as follows.

DETAILED DESCRIPTION

The following disclosed examples allow for locating a mobile station even when that mobile station is within a building such that traditional triangulation-based location techniques will not work. The disclosed examples facilitate locating a mobile station even when the mobile station is within a building where GPS triangulation methods are not possible because the mobile station cannot detect GPS satellite signals, for example. The disclosed examples provide a low cost, diverse and flexible approach to facilitating locating a mobile station for a variety of purposes including responding to an emergency call placed from a mobile station.

Figure 1:
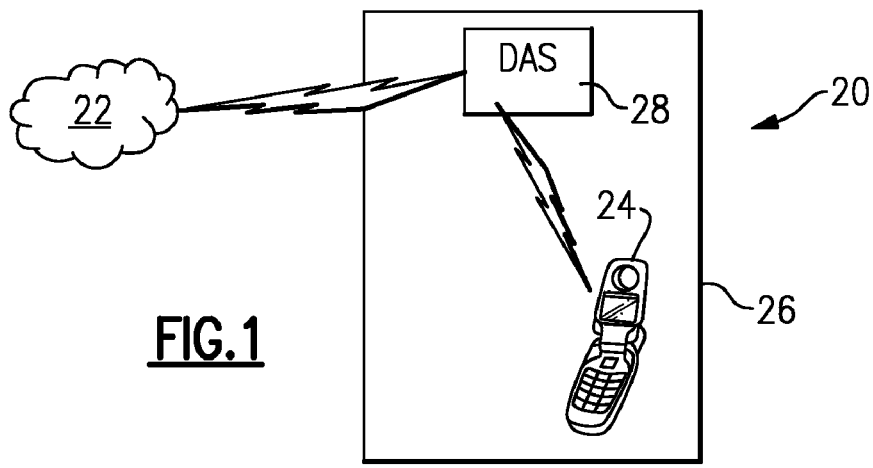
FIG. 1 schematically illustrates selected portions of a wireless communication system that is useful with an embodiment of this invention.

FIG. 1 schematically illustrates a wireless communication arrangement 20 including a wireless communication network 22 that operates in a generally known manner. A mobile station 24 is used to place a call from within a building 26. In this example, the mobile station 24 communicates through a distributed antenna system (DAS) 28 that provides wireless communication coverage within the building 26. The DAS 28 communicates with the network 22 to facilitate the call on behalf of the user of the mobile station 24.

In some instances, it will be necessary to determine the location of the mobile station 24. For example, if the mobile station 24 were used to place an emergency services call (e.g., a 911 or 112 call), it would be necessary to determine the location of the mobile station 24 in order to dispatch the appropriate response personnel. The mobile station 24 within the building 26 is unable to provide a location estimation based upon triangulation techniques even if the mobile station 24 has a global positioning system (GPS) receiver capability because the building 26 interferes with an ability to detect sufficient signals for triangulation. Instead, an indication associated with a signal used for wireless communication with the mobile station 24 identifies the location of the building 26 for purposes of locating the mobile station 24. Once the appropriate indicator is recognized and the building location 26 is identified, the mobile station location can be reported as the building address, longitude and latitude or other locating coordinates, for example.

Figure 2:
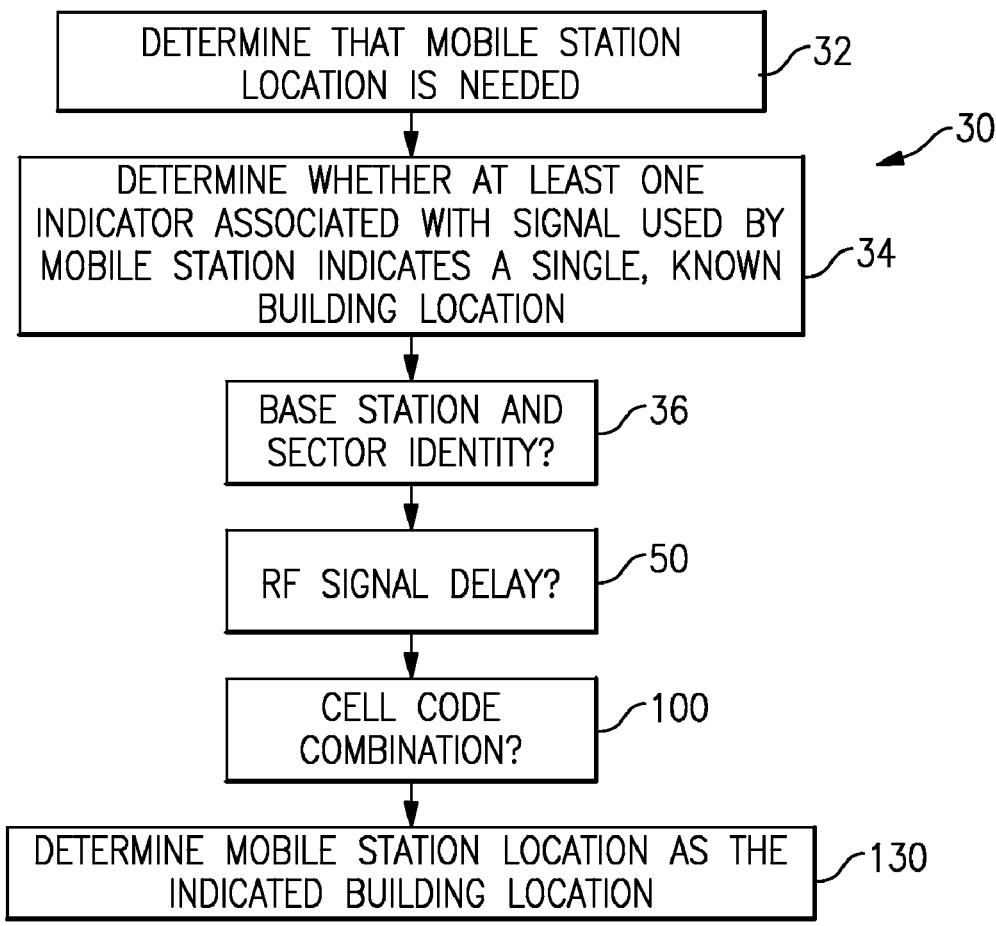
FIG. 2 is a flowchart diagram summarizing one example approach.

FIG. 2 includes a flowchart diagram 30 summarizing an example approach. At 32, a determination is made that a mobile station location is needed. One example use for a mobile station location would be to provide an appropriate response to an emergency services call as mentioned above. Other situations may require mobile station location information when other locating techniques are unavailable because the mobile station is within a building, for example. While the disclosed examples are particularly useful for emergency services calls, they are not necessarily limited to that use of mobile station location information. Providing a mobile subscriber with information regarding the vicinity in which the subscriber is located is one such example use of mobile station location information.

At 34, a determination is made whether at least one indicator associated with at least one signal used by the mobile station for wireless communication indicates a single, known building location. A particular and unique known building location is desired for accuracy in locating the mobile station.

Figure 3:
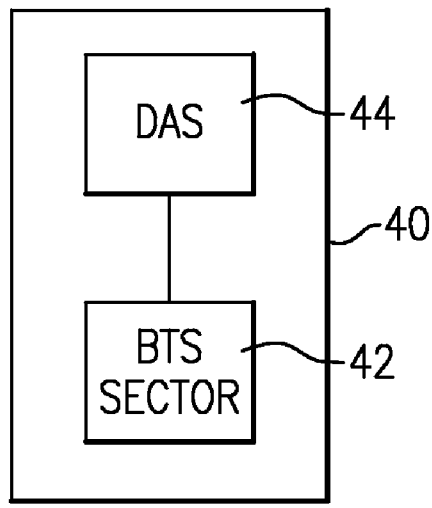
FIG. 3 schematically illustrates one example communication arrangement useful with an embodiment of this invention.

Several different indicators could be used in an implementation of this invention. The example of FIG. 2 includes a determination at 36 whether a base station and sector identity are useful as an indicator for indicating a single, known building location. FIG. 3 schematically illustrates an example arrangement including a building 40. Equipment 42 for establishing a base station transceiver (BTS) sector is situated to exclusively serve the inside of the building 40 (or a portion of the inside of the building 40 in some examples). In FIG. 3, a DAS 44 is associated with the equipment 42 for providing the BTS sector wireless coverage within the building 40 (or at least a portion of the building).

In such an example, the identity of the BTS sector equipment 42 and the associated sector also identifies the building 40 because the sector is dedicated to at least a portion of the space within the building 40 and it will be known where that particular equipment 42 has been installed. In other words, the base station and sector identity of the BTS sector equipment 42 in the example of FIG. 3 provides an indication of the location of the sector at the location of the building 40. Accordingly, whenever a mobile station is served within the sector within the building 40, the identity of the serving base station and sector provides an indicator of the location of the sector, which is the same as the location of the building 40 in this example.

In the case of the decision made at 36, once the base station and sector identity are determined, a check is made against a pre-established database whether that base station and sector identity corresponds to a specific building and an appropriate location determination such as longitude and latitude coordinates or a building address can then be derived from the database. That information can then be useful for reporting the determined location.

In some examples, a BTS sector will not be dedicated to a single building location. The example of FIG. 2 includes other possible indicators for indicating a single, known building location in such circumstances. At 50, a determination is made whether an RF signal delay provides an indicator for indicating a single, known building location. There are several ways in which a signal delay associated with a signal used by the mobile station 24 can provide sufficient information for locating a building from within which the mobile station 24 was used to place a call.

Figure 4:
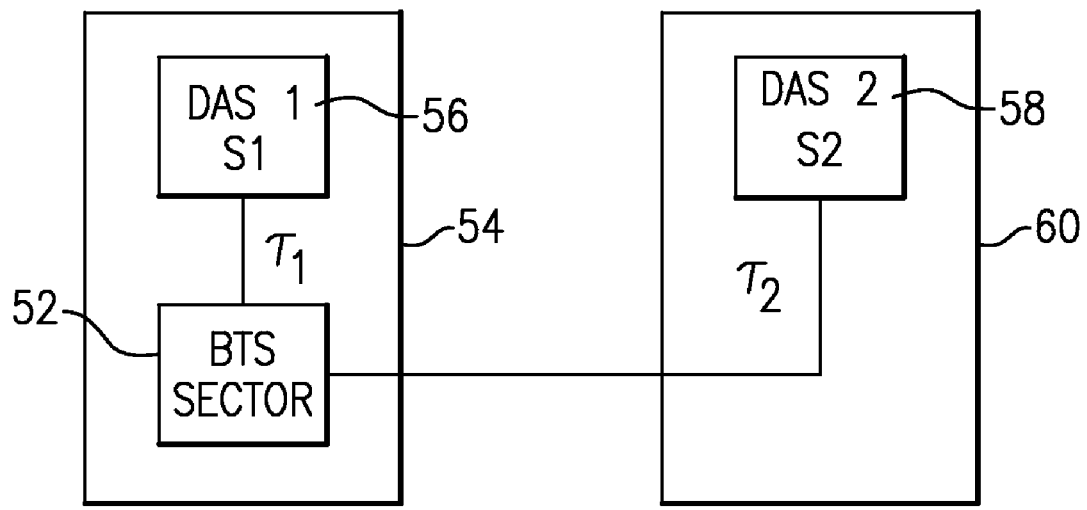
FIG. 4 illustrates another example communication arrangement.

FIG. 4 schematically illustrates an arrangement where BTS sector equipment 52 provides wireless communication coverage within a first building 54 using a DAS 56 dedicated to the building 54. The BTS sector equipment 52 in this example is also associated with another DAS 58 that is dedicated to providing wireless communication coverage within a second building 60. In this example, the BTS sector of the equipment 52 does not uniquely identify a single building because it provides wireless communication coverage within more than one building. In this example, an RF signal delay is useful for uniquely identifying within which of the buildings 54 or 60 a mobile station is located.

There are known techniques for measuring RF signal delays between mobile stations and base stations. CDMA cellular systems, for example, continuously measure RF signal delays between mobile and base stations. GSM and UMTS systems also measure RF signal delays between mobile and base stations on emergency services calls. By strategically controlling RF delays at selected building locations such that the delays are unambiguous, the delays are useful for uniquely identifying a particular building.

In the example of FIG. 4, there is a delay spread associated with each DAS 56 and 58, respectively. There is also an RF delay between the BTS sector equipment 52 and the input to each DAS. For purposes of discussion, the BTS sector equipment 52 is located in the building 54 along with the DAS 56. In this example, a delay $t_1$ associated with such a direct connection is effectively zero. A delay between the BTS sector equipment 52 and the DAS 58 within the building 60, on the other hand, has a larger value $t_2$. The delays associated with the RF signals used by a mobile station in the buildings 54 and 56 are configured to be distinct from each other and distinguishable so that the determined delay provides an indication of the building from which the mobile station 24 is placing a call.

Consider the DAS delay spreads within the two illustrated buildings as S1 and S2, respectively. The DAS RF delay in each building to the BTS sector equipment 52 can be as small as $t_1$ or $t_2$ up to $t_1+S1$ or $t_2+S2$, depending on from where the call is made. The DAS delay will generally be shortest when the call is made in close proximity to the antenna of the DAS that is nearest the BTS sector equipment 52. The DAS delay will generally be the longest when the call is made the furthest from the BTS sector equipment 52. Provided that $t_2$ is greater than $t_1+S1$, the delays measured from the RF signals from each building can be unambiguously distinguished. That is, the RF delay within the building 60 will range between $\{t_2, t_2+S2\}$. There is no overlap with $\{t_1, t_1+S1\}$ in the other building 54. Therefore, if the RF delays satisfy these criteria, the RF delay associated with each building 54 and 56 uniquely identifies the associated building. The building location based upon longitude and latitude coordinates or street address can then be determined from a pre-established data base that relates particular delay values with particular buildings, for example.

When there are more than two buildings served by a dedicated base station sector, it is possible to unique identify each building by appropriately controlling the delays associated with the RF signals used for communicating by a mobile station. Assume for example the set of delays $\{t_j+Sj\}$, j=1, 2, 3. The DAS delay in each building j to the dedicated base station can be as little as $t_1$ or $t_2$ or $t_3$ up to $t_1+S1$ or $t_2+S2$ or $t_3+S3$, depending on from where the call is placed. With $t_1+S1<t_2<t_1+S1+S2$, the shortest delay from building 2 will be between $\{t_1+S1, t_1+S1+S2\}$ and the longest delay will be between $\{t_1+S1+S2, t_1+S1+2S2\}$. With these constraints on $t_2$, the delays between building 1 and building 2 can be uniquely distinguished. With $t_1+S1+2S2<t_3$. The delays from building 3 will range between $\{t_1+S1+2S2, t_1+S1+2S2+S3\}$. Accordingly, the delays from building 3 can be uniquely distinguished from the delays measured from either of buildings 1 or 2 if these constraints on $t_3$ are implemented. Given this description, those skilled in the art will realize how to select, implement or choose delays to uniquely distinguish among multiple buildings to meet the needs of their particular situation.

Figure 5:
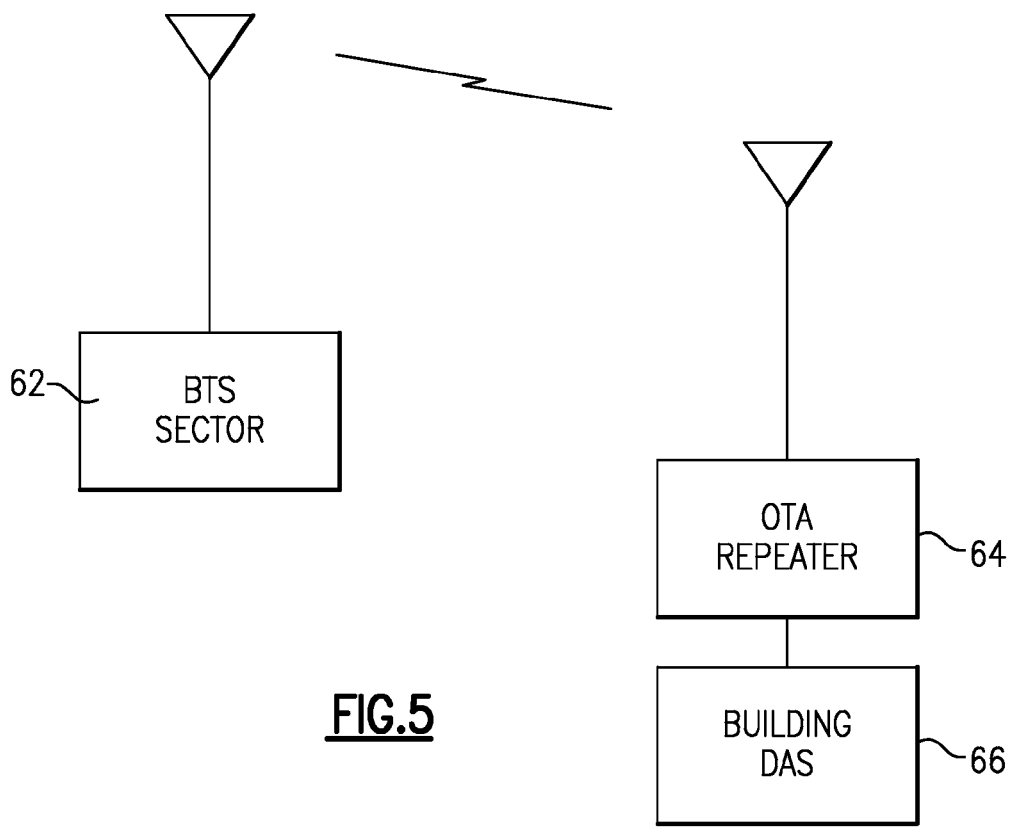
FIG. 5 schematically illustrates another example communication arrangement.
Figure 6:
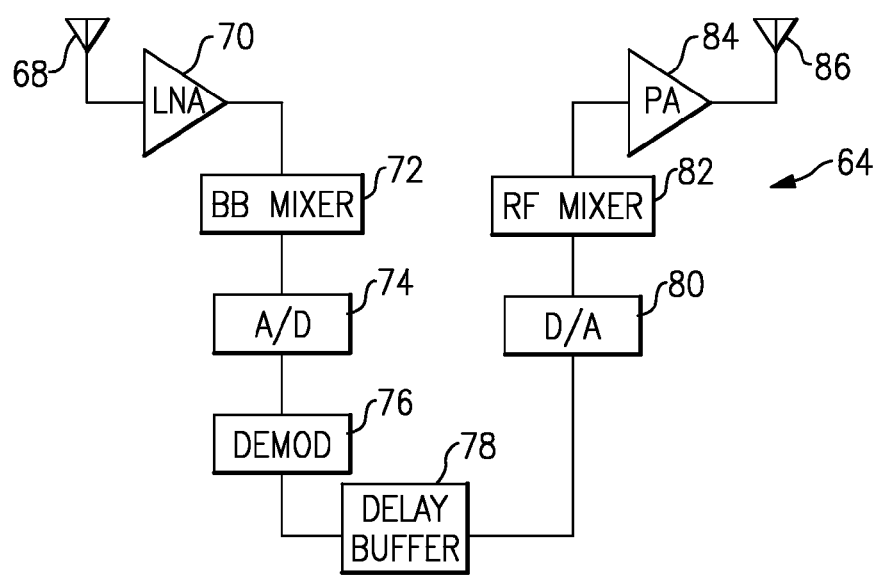
FIG. 6 schematically illustrates an example technique of introducing a delay into an RF signal used in an example embodiment of this invention.

FIGS. 5 and 6 schematically illustrate one example way of implementing such delays. In FIG. 5, a BTS sector 62 is established in a known manner. An over the air (OTA) repeater 64 receives signals from the BTS sector 62 and repeats them to provide them to a building DAS 66. In one example, the OTA repeater 64 is dedicated to a single building within which the DAS 66 is located.

The OTA repeater 64 contributes delay based on the delays that occur within the repeater in addition to RF propagation delays that occur over the air. Such delays in most cases are sufficient to uniquely identify a building. Consider, for example, the arrangement where the BTS sector 62 is located within a building or directly connected to a DAS of a building and the OTA repeater 64 is used to repeat the BTS sector signals into another building. The delays associated with the OTA repeater 64 in this instance, will be sufficient in many cases to uniquely identify the building associated with the OTA repeater 64 and the DAS 66 compared to the other building. Known techniques can be used for measuring the delays associated with the OTA repeater 64 and that information within a database can then be used for subsequently determining when a mobile station is communicating through the DAS 66 because of the associated delays that can be measured in a known manner.

In some instances it may be desirable to add additional delays when an OTA repeater is used. FIG. 6 schematically illustrates an example arrangement for accomplishing this. In this example, the OTA repeater 64 includes a receiving antenna 68 and a low noise amplifier (LNA) 70. A base band mixer 74, an analog to digital converter 74 and a demodulator 76 demodulate the RF signal so that it can be buffered in a delay buffer 78. By adding the buffering, additional delay is added to the RF signal. The arrangement of FIG. 6 includes a digital to analog converter 80, an RF mixer 82, an output amplifier 84 and an output antenna 86 for modulating the signal back into an analog RF signal for provision to the DAS 66, for example.

Figure 7:
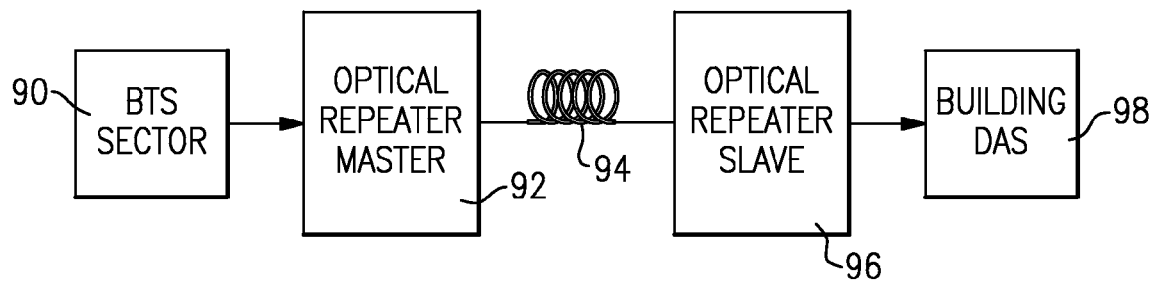
FIG. 7 schematically illustrates another communication arrangement.

FIG. 7 schematically shows another arrangement with which signal delays are useful for uniquely identifying a particular building location. In this example, BTS sector equipment 90 is associated with an optical repeater arrangement including an optical repeater master portion 92 located in close proximity to the BTS sector equipment 90, fiber optic cable 94 and an optical repeater slave portion 96 located at least somewhat remotely from the master portion 92. A building DAS 98 is connected to the optical repeater slave portion 96.

In this example, the fiber optic cable 94 includes additional cable length beyond that required for making the physical connection between the master portion 92 and slave portion 96. One example includes a spool of additional cable as part of that connection. The additional length of fiber optic cable adds additional delay in the signal provided from the BTS sector 90 to the DAS 98. Selectively controlling how much fiber optic cable is used in such an example allows for selectively controlling how much delay is introduced. Strategically selecting delay amounts allows for strategically and uniquely identifying different DASs from which wireless communication signals are obtained and, therefore, different buildings from which a mobile station may place a call.

Returning to FIG. 2, another possible indicator is considered at 100. In this instance, a determination is made whether a cell code combination provides an indication of a particular building location. A "cell code" as used in this description refers to a pseudo noise (PN) offset as used in a CDMA system, a scrambling code as used in a UMTS system or an equivalent cell identifier. In this example, an additional cell code is added to the signals used for wireless communication to provide a unique combination of cell codes that uniquely identifies a particular building. Selecting a particular combination of cell codes for particular locations and establishing a database regarding them makes it possible to use cell code combinations reported by a mobile station as an indicator of a single building location.

Figure 8:
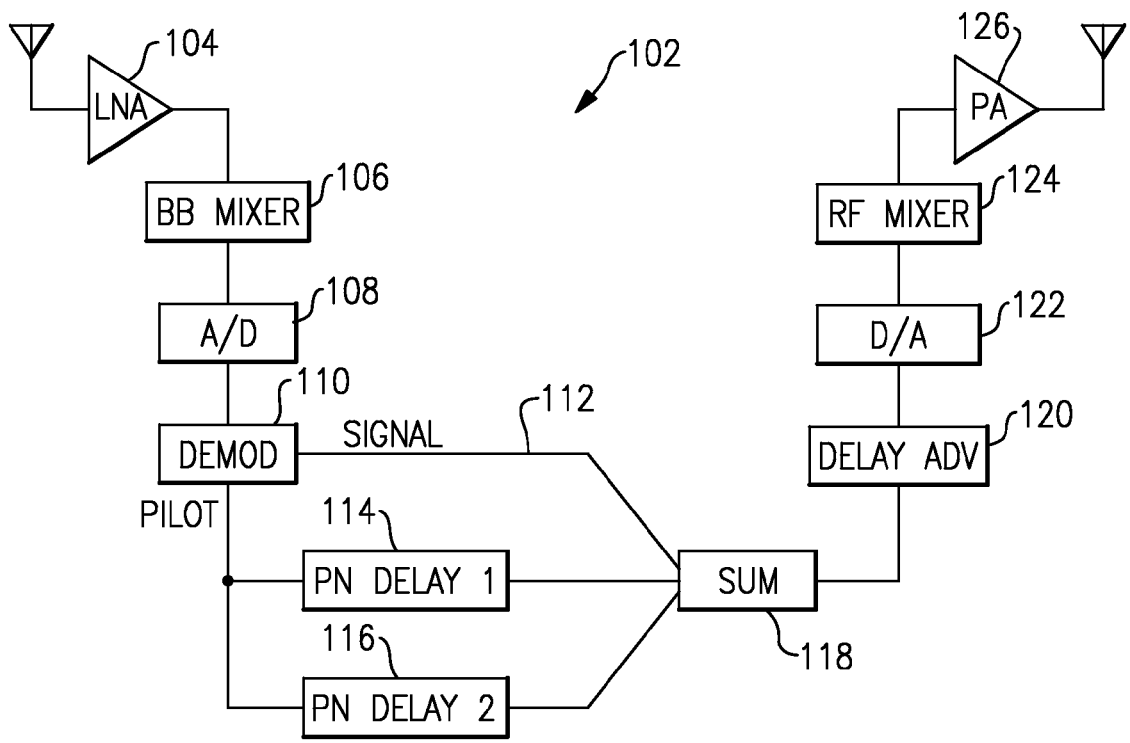
FIG. 8 schematically illustrates a technique for introducing additional cell codes according to one example embodiment of this invention.

FIG. 8 schematically illustrates an example generic repeater 102 for generating the plurality of PN offsets in a CDMA example implementation. In this example, a low noise amplifier 104, base band mixer 106, analog-to-digital converter 108 and demodulator 110 process a signal including a PN offset as received from a CDMA base station. The demodulated pilot signal is provided at 112. Buffers 114 and 116 delay the demodulated pilot signal by varying amounts using memory taps, for example. The output of the delays 114 and 116 are then added together with the demodulated pilot signal 112 using a summer 118. This generates a signal with multiple PN offsets. The size of the memory taps will determine the particular combination of PN offsets. By using a unique combination of PN offsets that are only seen by a mobile station within a particular building, the combination of cell codes (e.g., PN offsets) provides an indication of the building location.

In the example of FIG. 8, a delay advanced portion 120, digital to analog converter 122 and RF mixer 124 module the signal back into an analog RF signal that is provided to an output amplifier 126.

A mobile station receiving the signal output from the repeater 102 will detect the original pilot signal with its PN offset and the other generated PN offset combinations. The mobile station reports all of these PN offsets to the network (i.e., the mobile switching center currently handling the call). An appropriate lookup database can then be used for determining whether the combination of PN offsets corresponds to a known building location. If so, that building location is indicated by the combination of cell codes.

In a GSM or UMTS system, an analogous approach can be used for generating additional scrambling codes or equivalent cell codes so that a unique combination of cell codes is reported by a mobile station when communicating from within a particular building location.

As shown at 130 in FIG. 2, the building location is used for determining the mobile station location based upon the indicator that provided the building location information.

The example of FIG. 2 includes three possible types of indicators for indicating a single, known building location. Any one of them could be used alone or a combination of two or more of them could be used, depending on the needs of a particular situation. For example, a mobile station location determining algorithm may first check whether the base station and sector identity is sufficient for determining a building location. If not, information regarding the RF signal delays may be considered. If that is not conclusive, then determining whether a cell code combination reported by the mobile station indicates a known building location could be used. Another implementation includes considering at least two of the example types of indicators in parallel. When more than two types of indicators are considered, the results of analyzing one may be used as a redundancy check, for example. Other implementations may only consider one of the example types of indicators, depending on how the particular communication arrangement has been set up.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A method of locating a mobile station used for wireless communication, comprising the steps of:

determining whether at least one indicator associated with a signal used by the mobile station for a wireless communication identifies a single, known building location, the at least one indicator comprising a combination of cell codes reported by the mobile station, the combination of cell codes uniquely identifying the single, known building location, the combination of cell codes including a cell code included in a signal provided by a base station to identify at least one sector and at least one other cell code that is generated based upon the signal provided by the base station; and determining a location of the mobile station as the known building location based on the determined indicator.

2. The method of claim 1, wherein the at least one indicator comprises at least one of (i) a base station and sector designation that identifies a base station sector within which the mobile station was served, or (ii) a delay of a radio frequency signal used for a communication with the mobile station.

3. The method of claim 1, comprising establishing the at least one indicator based upon a delay of a radio frequency signal used for communication with the mobile station.

4. The method of claim 3, comprising controlling an amount of the delay for a selected building based upon at least one of a delay associated with transmitting signals between base station sector equipment and a distributed antenna system or a delay spread associated with the distributed antenna system.

5. The method of claim 3, comprising
establishing a unique amount of delay for each of a plurality of building locations that are part of a single base station sector.

6. The method of claim 3, wherein the delay is associated with an over the air repeater used for repeating base station sector signals.

7. The method of claim 6, comprising introducing additional delay.

8. The method of claim 3, wherein the delay is associated with a fiber optic cable used for communicating signals between base station sector equipment and a distributed antenna system within a building.

9. The method of claim 8, comprising
selecting an amount of the fiber optic cable to control the amount of delay associated with signal transmissions along the fiber optic cable.

10. The method of claim 1, comprising
generating a plurality of cell codes at a repeater in a combination that uniquely identifies a selected building location; and
associating the generated cell codes with a signal provided to the mobile station from the repeater.

11. The method of claim 1, wherein the generated cell codes comprise at least one of a PN offset or a scrambling code.

12. The method of claim 1, wherein the signal provided by the base station comprises a pilot signal and comprising
generating a plurality of cell codes by demodulating the pilot signal;
delaying the demodulated signal by a plurality of distinct amounts; and
adding the demodulated signal and the delayed signals to thereby generate multiple PN offsets, each of the PN offsets being included in the combination of cell codes reported by the mobile station.

13. The method of claim 1, wherein the signal provided by the base station comprises a pilot signal and the method includes
receiving the pilot signal from the base station at a repeater;
demodulating the pilot signal at the repeater;
delaying the demodulated pilot signal by a plurality of different amounts;
adding a result of each of the delays to the demodulated pilot signal to thereby produce a signal with a plurality of PN offsets, each of the PN offsets being included as the at least one other cell code.

14. The method of claim 13, comprising
selecting a size of each of a plurality of memory taps such that each memory tap will introduce a unique delay to the demodulated pilot signal to thereby produce a unique PN offset.

15. The method of claim 13, comprising
configuring a plurality of repeaters each with a unique combination of delays for delaying the demodulated pilot signal in a manner that each of the repeaters generates a unique combination of PN offsets.

* * * * *